(12) United States Patent
Forshaw

(10) Patent No.: US 11,591,035 B2
(45) Date of Patent: Feb. 28, 2023

(54) BICYCLE COVER

(71) Applicant: CYCXI LIMITED, Bilston (GB)

(72) Inventor: Mark Forshaw, Hampshire (GB)

(73) Assignee: CYCXI LIMITED, Bilston (GB)

( * ) Notice: Subject to any disclaimer, the term of this patent is extended or adjusted under 35 U.S.C. 154(b) by 574 days.

(21) Appl. No.: 16/343,198

(22) PCT Filed: Oct. 19, 2017

(86) PCT No.: PCT/GB2017/053169
§ 371 (c)(1),
(2) Date: Apr. 18, 2019

(87) PCT Pub. No.: WO2018/073597
PCT Pub. Date: Apr. 26, 2018

(65) Prior Publication Data
US 2019/0241226 A1    Aug. 8, 2019

(30) Foreign Application Priority Data

Oct. 19, 2016    (GB) ...................................... 1617694

(51) Int. Cl.
*B62J 19/00*    (2006.01)
(52) U.S. Cl.
CPC ..................... *B62J 19/00* (2013.01)
(58) Field of Classification Search
CPC .................................. B62J 19/00; B62J 23/00
USPC ........................................................ 150/167
See application file for complete search history.

(56) References Cited

U.S. PATENT DOCUMENTS

| | | | | |
|---|---|---|---|---|
| 3,659,872 A | * | 5/1972 | Warner | B62J 19/00 296/78.1 |
| 3,968,913 A | * | 7/1976 | Weed | B60R 9/10 224/488 |
| 4,283,084 A | * | 8/1981 | Gallagher | B62J 19/00 296/78.1 |
| 4,598,725 A | * | 7/1986 | Brewer | A41D 3/08 135/119 |
| 4,944,340 A | * | 7/1990 | Tortorich | B60R 9/055 206/335 |
| 4,976,389 A | * | 12/1990 | McLellan | B60R 9/10 224/328 |
| 5,193,724 A | * | 3/1993 | Robbins | B62J 19/00 150/167 |

(Continued)

FOREIGN PATENT DOCUMENTS

CN    201161646 Y  *  1/2008
CN    201 161 646       12/2008
(Continued)

*Primary Examiner* — John K Fristoe, Jr.
*Assistant Examiner* — Justin Caudill
(74) *Attorney, Agent, or Firm* — Occhiuti & Rohlicek LLP

(57) ABSTRACT

A bicycle cover (10) comprising a first material piece (11), a second material piece (12), and a first resilient element, the first resilient element being provided about a periphery (13) of the first material piece, the bicycle cover having a folded configuration in which portions of the first material piece and the second material piece lie adjacent one another and an expanded configuration in which the cover is adapted to receive a bicycle between the first and second material pieces, the first resilient element being biased to urge the cover towards the expanded configuration.

13 Claims, 10 Drawing Sheets

(56) References Cited

U.S. PATENT DOCUMENTS

| | | | | |
|---|---|---|---|---|
| 5,282,502 A * | 2/1994 | Ballard | ............... | B62J 19/00 |
| | | | | 150/167 |
| 5,562,139 A * | 10/1996 | Cseri | ............... | B62J 19/00 |
| | | | | 206/335 |
| 5,921,389 A * | 7/1999 | Zoffer | ............... | B60J 11/00 |
| | | | | 206/335 |
| 6,209,599 B1 * | 4/2001 | Richardson | ............... | B62J 19/00 |
| | | | | 296/136.07 |
| 6,405,771 B1 * | 6/2002 | Mote | ............... | B62J 19/00 |
| | | | | 150/167 |
| 7,216,658 B1 | 5/2007 | Navarro | | |
| 2005/0045255 A1 | 3/2005 | Yang | | |
| 2009/0249528 A1 | 10/2009 | Su | | |
| 2014/0041773 A1 * | 2/2014 | Roberts | ............... | B62J 19/00 |
| | | | | 150/167 |

FOREIGN PATENT DOCUMENTS

| | | |
|---|---|---|
| JP | 2008 044486 | 2/2008 |
| JP | 2009 166730 | 7/2009 |
| WO | 2013/021313 | 2/2013 |

\* cited by examiner

BICYCLE COVER

CROSS-REFERENCE TO RELATED APPLICATIONS

The application claims the benefit of, and priority to, International Application No. PCT/GB2017/053169, entitled "Bicycle Cover," and filed Oct. 19, 2017, which claims the benefit of, and priority to, UK application No. GB 1617694.3, filed Oct. 19, 2016, the contents of all of which are hereby incorporated by reference in their entireties.

The present invention relates to covers. In particular the present invention relates to covers for bicycles.

BACKGROUND

Cycling is increasingly popular both as a way of commuting and as a pastime. Bicycles often become dirty through being used, such as becoming wet, muddy and/or dusty. Even when clean, the chain of the bicycle is typically oiled. Thus when storing or transporting the bicycle care must be taken that the bicycle does not contact other items with which it is stored or surfaces with which it may come into contact, so that these other items or surfaces do not become dirty.

This can be achieved by covering the bicycle in a plastic sheet, or placing a plastic sheet under the bicycle in a vehicle. This is inconvenient since the bicycle is liable to move away from the sheet and may therefore still make contact with another surface, making it dirty.

A bicycle may also be put into a bag. However, it can be cumbersome to put the bicycle in the bag, and a bicycle in a bag is not as easily moved around.

There is therefore a need for an improved cover.

SUMMARY

According to an aspect of the present invention, there is provided a bicycle cover comprising:
  a first material piece,
  a second material piece, and
  a first resilient element,
the first resilient element being provided about a periphery of the first material piece, the bicycle cover having a folded configuration in which portions of the first material piece and the second material piece lie adjacent one another and an expanded configuration in which the cover is adapted to receive a bicycle between the first and second material pieces, the first resilient element being biased to urge the cover towards the expanded configuration.

Suitably the cover comprises a joining portion for joining the first material piece and the second material piece.

Suitably the first material piece and the second material piece are spaced from one another in the expanded configuration.

Suitably the cover comprises a second resilient element provided about a periphery of the second material piece, the second resilient element being biased to urge the cover towards the expanded configuration.

Suitably at least one of the first resilient element and the second resilient element are provided about the whole periphery of the respective material piece.

Suitably at least one of the first resilient element and the second resilient element comprises a resilient wire or rod.

Suitably in the expanded configuration the cover defines a gap between the first material piece and the second material piece around at least a portion of the periphery of the first and second material pieces.

Suitably the cover comprises a closure portion for at least partially closing the gap, the closure portion being attachable to the first material piece and releasably engageable to the second material piece.

Suitably the closure portion comprises a first engagement portion and the second material piece comprises a second engagement portion, the first engagement portion being releasably engageable with the second engagement portion to at least partially close the gap.

Suitably the closure portion comprises a third engagement portion and the second material piece comprises a fourth engagement portion, the third engagement portion being releasably engageable with the fourth engagement portion to at least partially close the gap.

Suitably the first engagement portion and the third engagement portion are spaced from one another, and the closure portion comprises a material portion between the first and third engagement portions.

Suitably the first engagement portion and the second engagement portion, and/or the third engagement portion and the fourth engagement portion, comprise cooperating engagement features, the cooperating engagement features comprising at least one of hook and loop fasteners, magnetic fasteners, press studs, and clip fasteners.

Suitably the gap provides an opening for permitting a bicycle to be receivable within the cover, and the closure portion is releasably engageable with the second material piece for retaining the bicycle within the cover.

Suitably the closure portion is adapted to close the gap adjacent a pedal of a bicycle within the cover.

Suitably when the closure portion is engaged with the second material piece, a wheel of the bicycle is permitted to protrude through the gap between the first material piece and the second material piece so that the bicycle wheel is movable along a surface.

Suitably the joining portion comprises an opening, the opening being for receiving therethrough a saddle of the bicycle.

Suitably the cover comprises a first fastening portion attachable to the first material piece and a second fastening portion attachable to the second material piece, the first fastening portion being releasably engageable with the second fastening portion to engage with a portion of a bicycle for retaining the bicycle within the cover.

Suitably at least one of the first material piece, the second material piece, the joining portion and the material portion comprises a water-resistant material.

Any one or more feature of any aspect above may be combined with any one or more feature of that aspect and/or any other aspect above. Any apparatus feature may be written as a method feature where possible, and vice versa. These have not been written out in full here merely for the sake of brevity.

This Summary is provided to introduce a selection of concepts in a simplified form that are further described below in the Detailed Description. The mention of features in this Summary does not indicate that they are key features or essential features of the invention or of the claimed subject matter, nor is it to be taken as limiting the scope of the claimed subject matter.

BRIEF DESCRIPTION OF THE FIGURES

The present invention will now be described by way of example with reference to the accompanying drawings. In the drawings.

DETAILED DESCRIPTION

Figure 1:
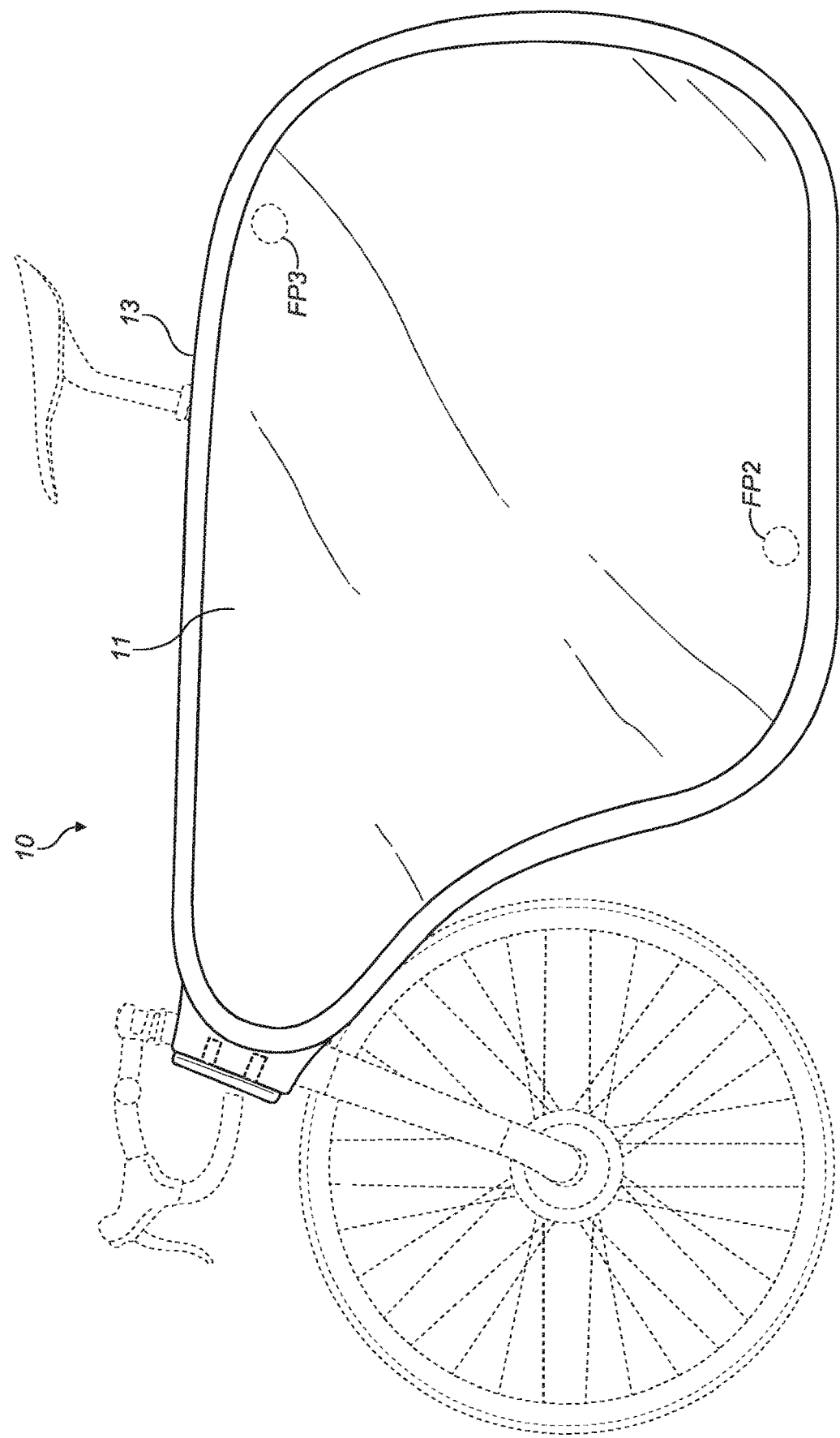
FIG. 1 illustrates a side view of a bicycle cover in place around a bicycle.
Figure 2:
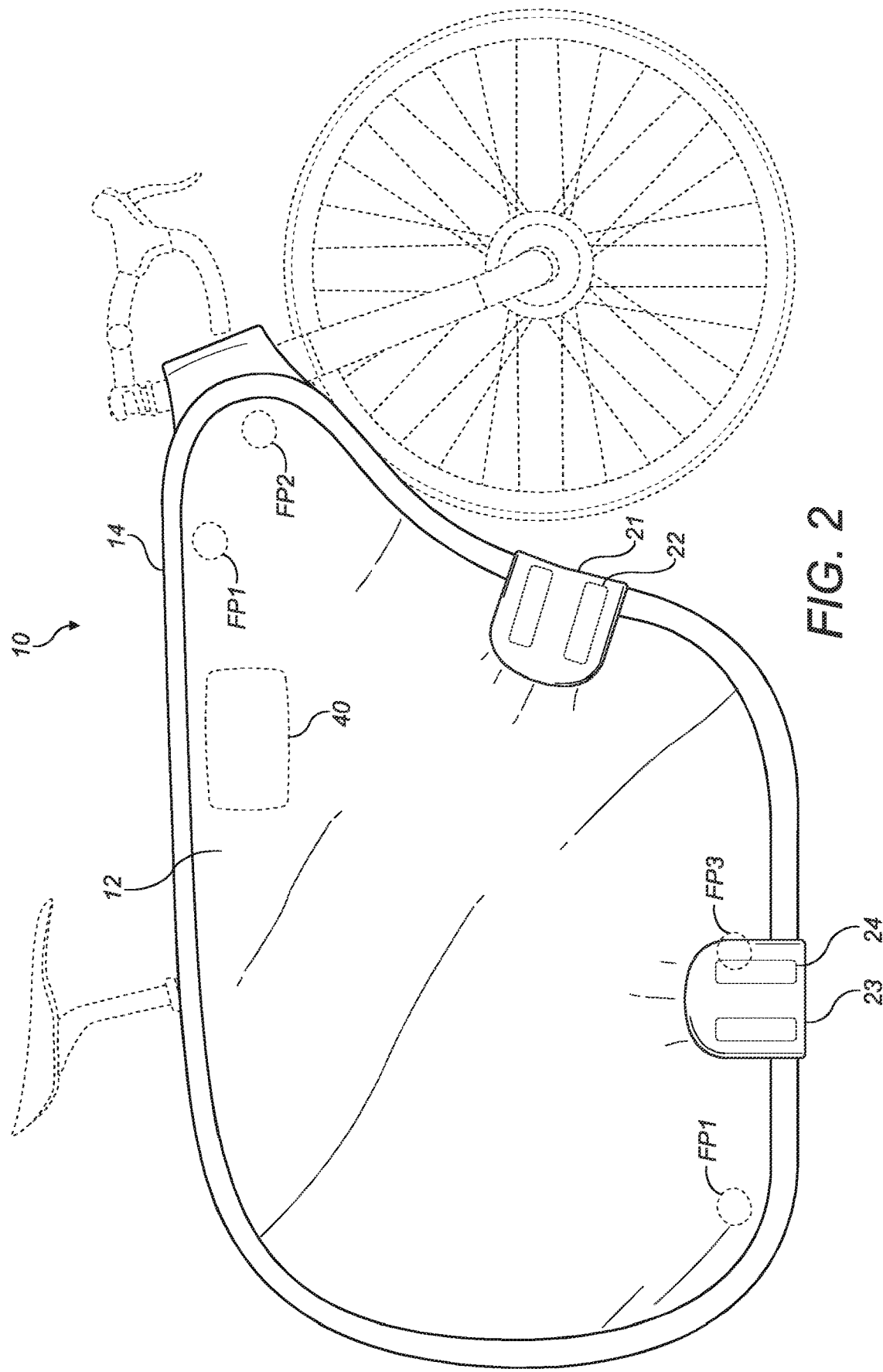
FIG. 2 illustrates an opposing side view of the bicycle cover of FIG. 1.

A cover for a bicycle is illustrated in FIGS. 1 and 2. The cover 10 can be placed about a bicycle to protect the surroundings from becoming dirty by touching at least a portion of the bicycle. For example, the cover can restrict or prevent at least one of a pedal (or both pedals), a handlebar (or both handlebars), a brake lever (or both brake levers) and a frame of the bicycle coming into contact with one or more of an external or internal wall such as a building wall, a window, vehicle bodywork, an inside of a vehicle, any other item stored close to the bicycle and clothing. This can accordingly restrict or prevent such areas/items thereby becoming dirty, dented, cracked, smashed, scratched and/or ripped. Similarly, the cover can restrict or prevent the bicycle from becoming scratched, damaged and so on by nearby areas/items.

In the illustrated example, the cover covers the bulk of the frame of the bicycle, including the pedals, chain and the rear wheel. The front wheel and handlebars extend beyond the cover to permit the bicycle to be conveniently moved and steered even when the cover is in place on the bicycle.

The saddle is permitted to extend outside the cover. This means that the cover can be more compact in size, since the top of the saddle may be much higher than the top of the rest of the bicycle. Also, the saddle extending outside the cover provides another convenient way of holding and manipulating the bicycle when the cover is in place.

As illustrated, the cover comprises two sides or material pieces, a first material piece 11 and a second material piece 12. The two material pieces define a space between them into which the bicycle is receivable.

Each material piece comprises a rim or margin around at least a portion of its periphery. In the illustrated example the rims extend around the whole of the periphery of each material piece. This is not necessary in all examples, as, for example, there may be a continuous portion of material linking the first material piece to the second material piece. Such a continuous portion of material can obviate the need for a rim adjacent the continuous portion.

Referring to FIGS. 1 and 2, the first material piece has a first periphery 13. The second material piece has a second periphery 14.

The cover is shown in FIGS. 1 and 2 in an expanded configuration. The cover also has a folded configuration, as will be described in more detail below.

In the expanded configuration, the first material piece 11 and the second material piece 12 are spaced from one another. A joining portion 15 is provided to join the first material piece 11 and the second material piece 12 together. Suitably the joining portion comprises material linking the first and second material pieces together. The joining portion 15 need not be provided as a single portion of material, but can be provided as separate portions of material which each join or link the first material piece 11 and the second material piece 12.

Figure 3:
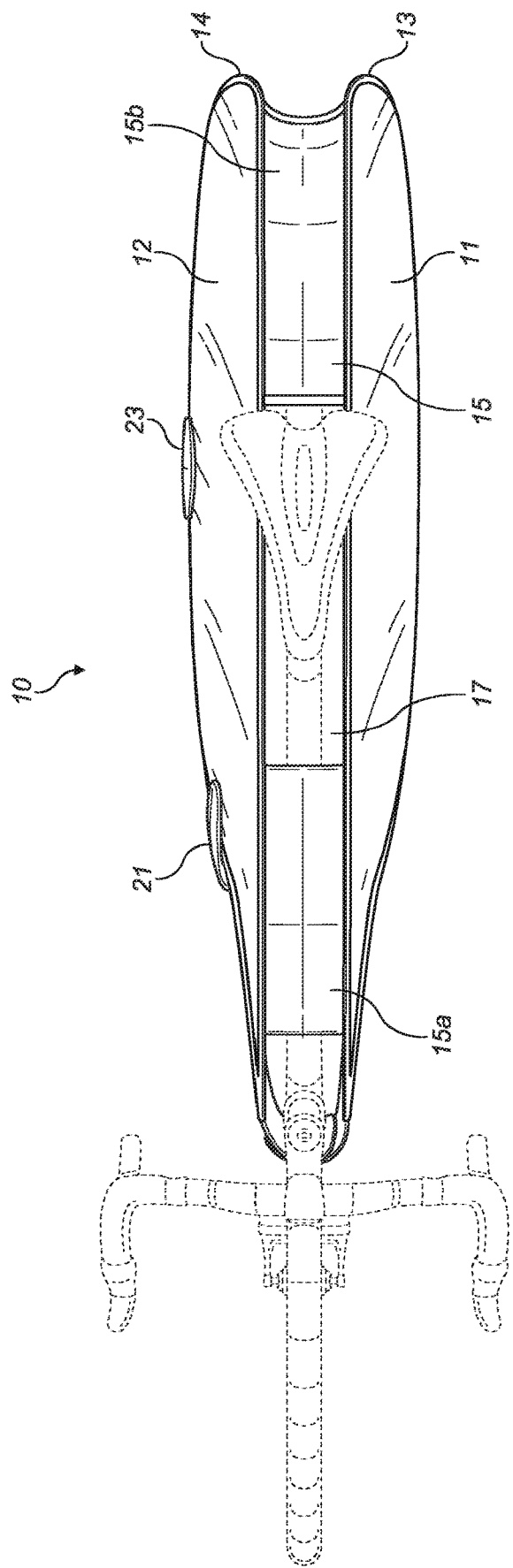
FIG. 3 illustrates a top view of the bicycle cover of FIG. 1.
Figure 4:
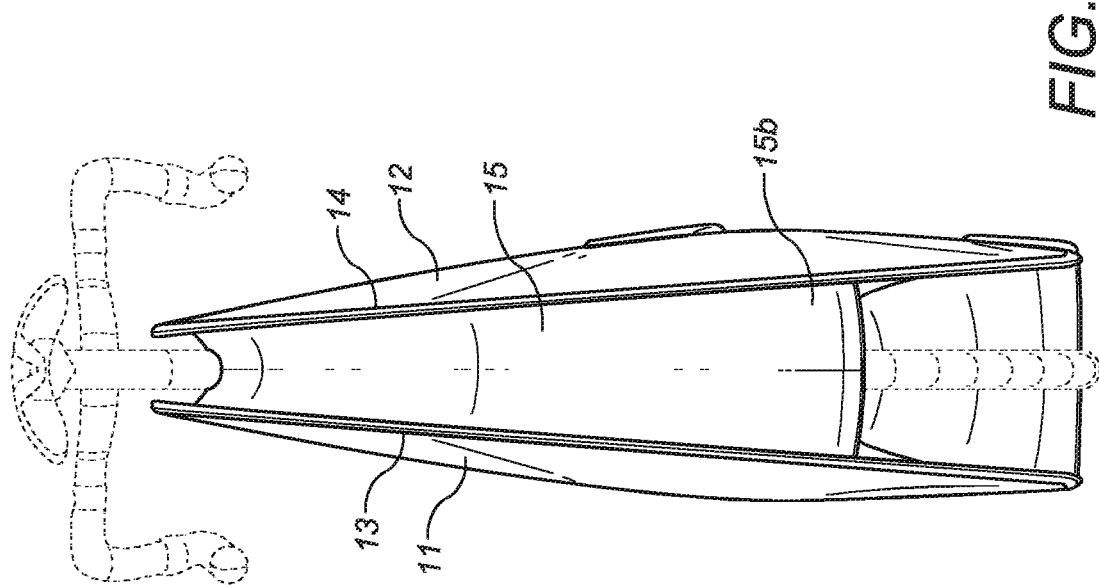
FIG. 4 illustrates a rear view of the bicycle cover of FIG. 1.

Referring now to FIGS. 3 and 4, the joining portion comprises a front joining portion 15a which is disposed towards a front of the cover 10, and a rear joining portion 15b which is disposed towards a rear of the cover 10.

Suitably the cover 10 comprises several spaces between the first material piece 11, the second material piece 12 and the joining portion 15. Suitably a gap 16 is provided towards the front of the cover 10. The gap is large enough to permit a bicycle to be received into the cover 10 through the gap 16.

The cover also comprises an opening 17 provided between the front joining portion 15a and the rear joining portion 15b. Suitably the opening is located and sized to permit a saddle of a bicycle covered by the cover to pass through the opening 17.

In this way, a bicycle can be received into the cover through the gap 16 towards the front of the cover 10, and the cover 10 lowered onto the bicycle so as to allow the saddle of the bicycle to pass through the opening 17.

The rear joining portion 15b suitably joins the first material piece 11 and the second material piece 12 around an upper and rearward portion of the cover 10. That is to say, the rear joining portion 15b is suitably provided so as to cover the upper and rear portions of a wheel of a bicycle covered by the cover 10. This means that a surface, against which the rear of the cover 10 may rest, will not become dirty since it will be protected by that portion of the rear joining portion 15b that covers the rear portion of the wheel.

The rear joining portion 15b can also restrict the movement of the bicycle in a rearward direction relative to the cover 10. In other words the rear joining portion 15b can assist in retaining the bicycle within the cover 10.

Figure 5:
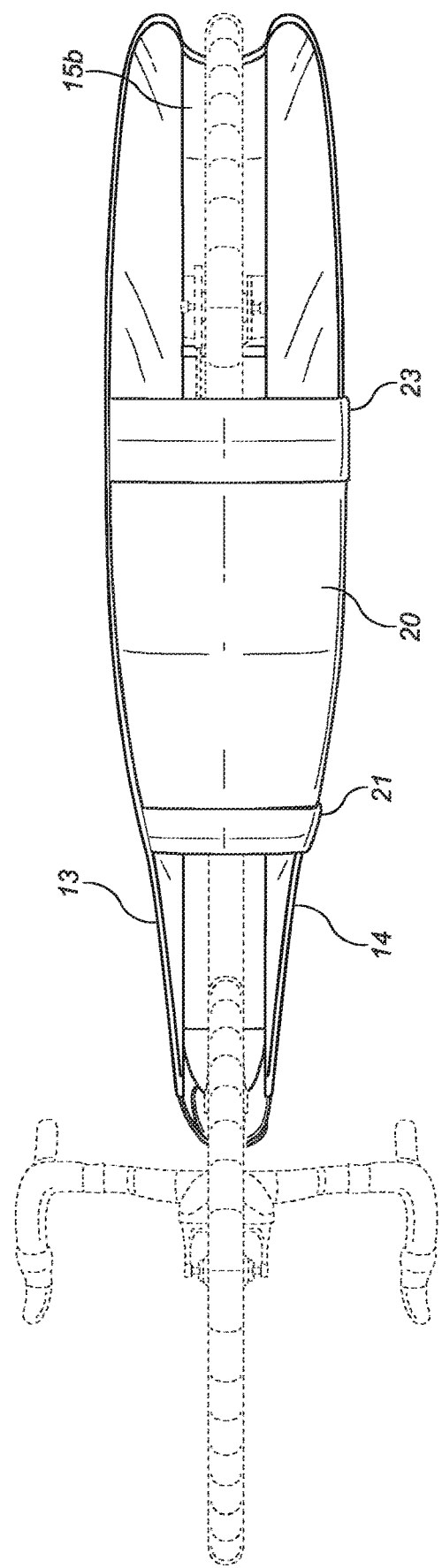
FIG. 5 illustrates a bottom view of the bicycle cover of FIG. 1.

Referring now to FIGS. 2 and 5, a covering portion 20 is provided as part of the cover 10. The covering portion 20 is provided to cover at least a part of the space or gap between the first material piece 11 and the second material piece 12.

The covering portion 20 is, in the illustrated example, attached to the first material piece 11. The covering portion 20 comprises a first engagement portion 21. The first engagement portion 21 is releasably engageable with a cooperating second engagement portion. The second engagement portion is provided on or as part of the second material piece 12.

Figure 6:
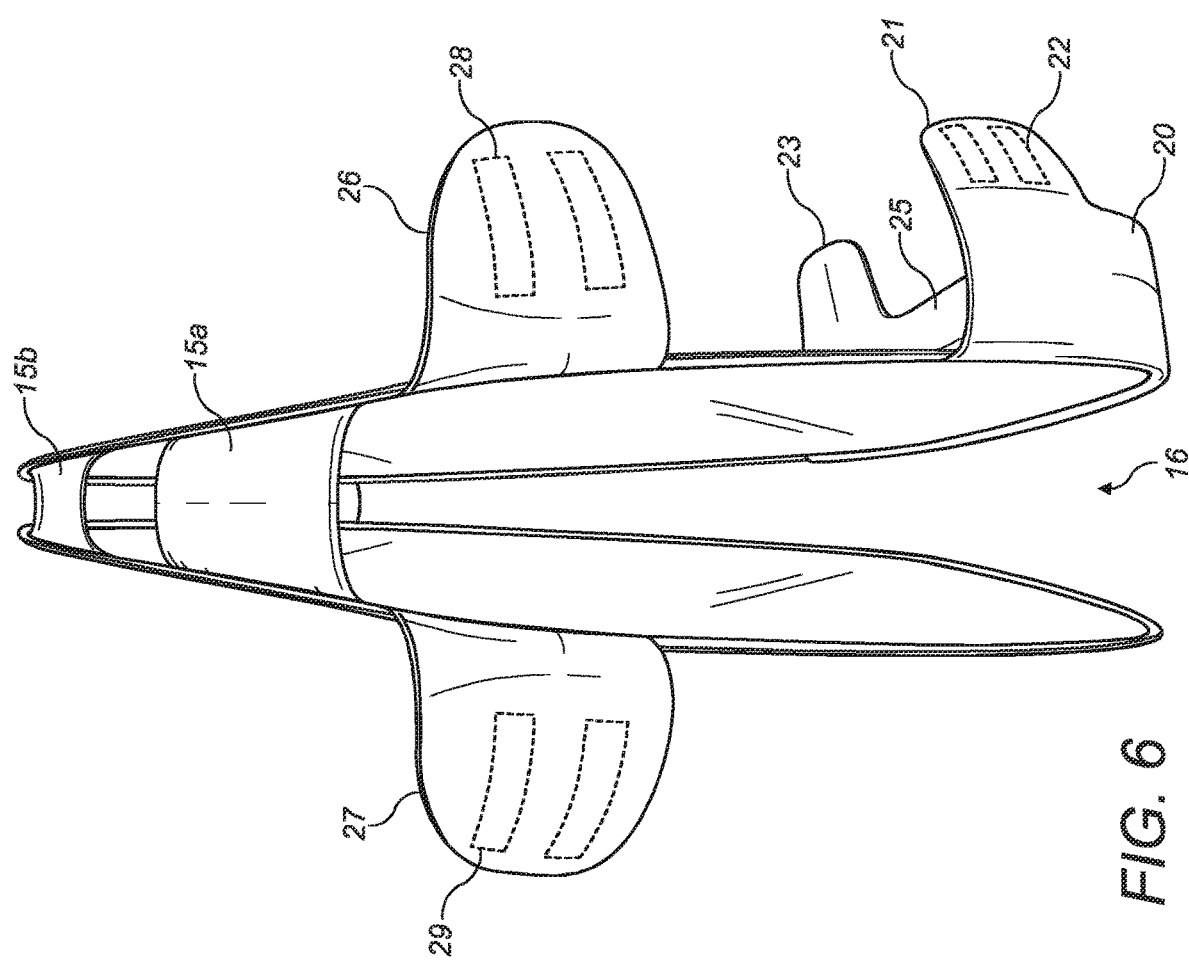
FIG. 6 illustrates an open state of the bicycle cover of FIG. 1.
Figure 7:
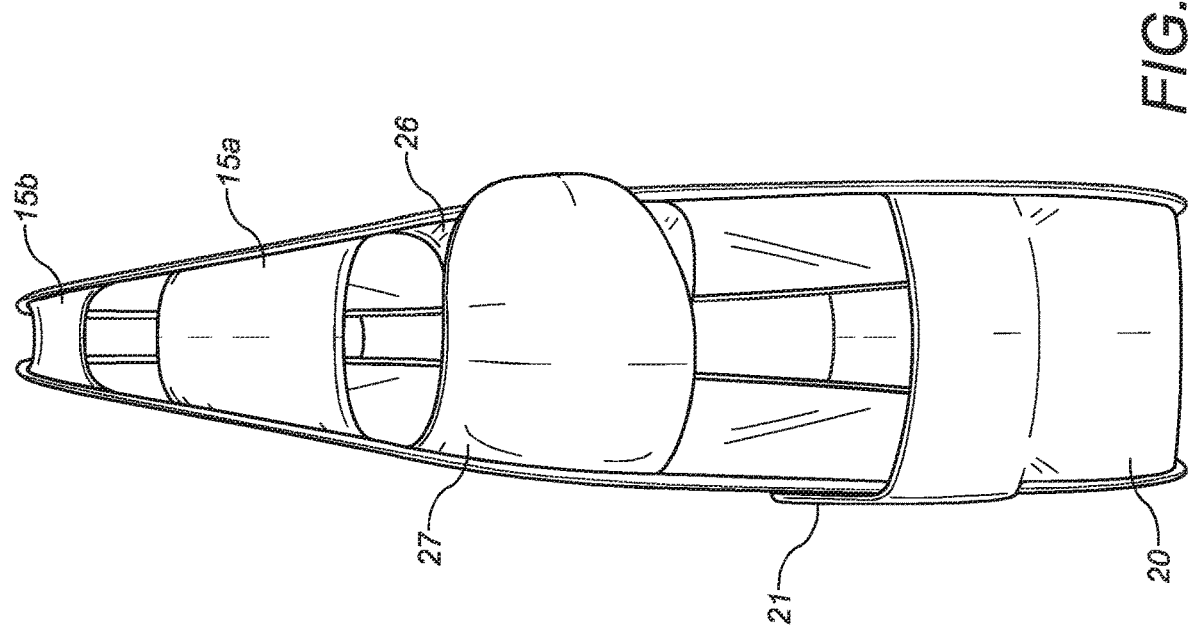
FIG. 7 illustrates a closed state of the bicycle cover of FIG. 1.

As illustrated in FIG. 6, the first engagement portion 21 comprises two engagement features 22. In general, the first engagement portion 21 comprises one or more engagement feature. The engagement feature 22 is configured to releasably engage with a cooperating engagement feature on the second engagement portion. For instance, the engagement feature 22 on the first engagement portion 21 can comprise one part of a hook and loop fastener, and the cooperating engagement feature on the second engagement portion can comprise the cooperating part of the hook and loop fastener.

The covering portion 20 illustrated in FIG. 6 comprises a third engagement portion 23. The third engagement portion 23 is releasably engageable with a cooperating fourth engagement portion. The fourth engagement portion is provided on or as part of the second material piece 12.

The third engagement portion 23 comprises one or more engagement feature 24 (two such engagement features are illustrated in FIG. 2). The engagement feature 24 is configured to releasably engage with a cooperating engagement feature on the fourth engagement portion. For instance, the engagement feature 24 on the third engagement portion 23 can comprise one part of a hook and loop fastener, and the cooperating engagement feature on the fourth engagement portion can comprise the cooperating part of the hook and loop fastener.

The engagement features on any one or more of the first engagement portion 21, the second engagement portion, the third engagement portion 23 and the fourth engagement portion suitably comprise at least one of hook and loop fasteners, magnetic fasteners, press studs, and clip fasteners. Any other suitable engagement mechanism can be used.

Suitably the closure portion 20 is elongate along a length of the cover 10. The first engagement portion 21 and the third engagement portion 23 can be spaced from one another in a direction generally along the length of the cover 10. The covering portion 20 comprises a material portion 25 which extends between the first engagement portion 21 and the second engagement portion 23.

Suitably the size of the first engagement portion 21 and the third engagement portion 23, and the width of the covering portion 20, for example the width of the material portion 25, is such as to permit the closure portion 20 to close the gap between the first material piece 11 and the second material piece 12 when a bicycle is received within the cover 10.

In this way the covering portion 20 is able both to close at least a portion of the gap through which the bicycle was received into the cover 10, and to provide protection to the surroundings from that part of the bicycle adjacent the covering portion 20 when retained in the cover 10.

Suitably the covering portion 20, and the material portion 25 in particular, is provided adjacent the pedals and chain of a bicycle within the cover 10. Since the pedals protrude from the frame of the bicycle, it is the pedals that often contact the surroundings, which can make the surroundings dirty. Further, as mentioned above, the chain can be oily, so should be kept separate from the surroundings to prevent anything coming into contact with the chain and thereby becoming dirty.

Providing the covering portion 20 adjacent the pedals and chain therefore restricts the transfer of dirt, such as mud and/or oil, from the bicycle to the surroundings. In one example, the covering portion 20 can fully (or nearly so) close the gap adjacent the front part of the chain set. This can further restrict the transfer of dirt from the pedals/pedal crank to the bicycle's surroundings.

As illustrated in FIG. 5, the covering portion 20 passes from the first material piece 11 to the second material piece 12 underneath the bicycle. This means that even if any material, such as mud and/or oil, falls off the pedals, pedal crank and/or chain of the bicycle, it will be caught by the covering portion 20. The covering portion 20 therefore assists in keeping the surroundings clean. The covering portion can act as a form of tray in catching such falling dirt.

The first material piece 11 and the second material piece 12 are suitably spaced from each other to provide sufficient space between them to permit the pedals of a bicycle received within the cover to move, so that the bicycle can conveniently be wheeled along.

Referring now to FIGS. 4 and 5, when the covering portion 20 is closed, a gap is provided at an underside of the cover 10 towards the rear of the cover 10. This gap permits the rear wheel of a bicycle covered by the cover 10 to extend or pass through the cover so as to contact a surface. For example, the wheel can contact the ground when the bicycle, covered by the cover 10, is placed on the ground. This enables the bicycle to be wheeled along even with the cover in place. This, coupled with the handlebar and front wheel extending beyond the cover 10 enables convenient movement of the bicycle even when it is covered by the cover 10. In this manner the bicycle can conveniently be moved forwards or backwards.

The cover 10 suitably also comprises a fastener towards the front of the cover 10. The fastener is able to releasably fasten the cover 10 to a front portion of a bicycle, for example to the front of the frame of a bicycle. The fastener is suitably releasably engageable with one or more of the head tube, the headset and the stem of the bicycle. The fastener permits the cover 10 to be more securely retained to the bicycle.

The fastener comprises a first fastening portion 26 and a second fastening portion 27. The first fastening portion 26 and the second fastening portion 27 are provided on or as part of the first material piece 11 and the second material piece 12, respectively. In the illustrated example, the first fastening portion 26 is attached to the first material piece 11 at the first periphery 13, and the second fastening portion 27 is attached to the second material piece 12 at the second periphery 14.

As illustrated in FIG. 6, the first fastening portion 26 comprises two engagement features 28. In general, the first fastening portion 26 comprises one or more engagement feature. The engagement feature 28 is configured to releasably engage with a cooperating engagement feature 29 on the second fastening portion 27. For instance, the engagement feature 28 on the first fastening portion 26 can comprise one part of a hook and loop fastener, and the cooperating engagement feature 29 on the second fastening portion 27 can comprise the cooperating part of the hook and loop fastener.

The engagement features 28, 29 on the first fastening portion 26 and the second fastening portion 27 suitably comprise at least one of hook and loop fasteners, magnetic fasteners, press studs, and clip fasteners. Any other suitable engagement mechanism can be used.

The cover 10 comprises at least one resilient element located at one or both of the first periphery 13 and the second periphery 14. Suitably the resilient element is retained at the respective periphery, for example the resilient element may be provided within a rim or margin portion at or towards the periphery, such as being retained within a hem at the respective periphery.

Suitably each of the first periphery 13 and the second periphery 14 is provided with a respective resilient element. The resilient element extends around at least a portion of the respective periphery. Suitably the resilient element extends around a majority of the portion of the respective periphery. Preferably the resilient element extends around the whole of the periphery of the respective material piece.

The resilient element is resiliently biased so as to urge the cover 10 towards the expanded configuration. For example, the resilient element is biased to adopt a shape as depicted in FIG. 1 for the periphery, or that portion of the periphery along which the resilient element extends. As the resilient element changes shape under the action of its biasing, it will cause the cover to move towards the expanded configuration. Suitably the first material piece 11, the second material piece 12, the joining portion 15 and the covering portion 20 are made from a compliant material or fabric so as to permit the movement of the cover 10 towards the expanded configuration under action of the resilient element. The biasing assists in the opening/deployment of the cover. This helps to make the cover easier for a person to use.

Suitably the resilient element is at least semi-rigid, and is therefore able to support the shape of the cover 10 in the expanded configuration. In a preferred example, as illustrated in, for example, FIG. 4, the cover 10 comprises two resilient elements, one provided at each of the first periphery 13 and the second periphery 14. The resilience of the resilient elements lends some rigidity to the periphery of the respective material piece, and enables the cover 10 to retain its expanded configuration when not acted on by other forces. This can assist in improving the usability of the cover. Providing the cover with some rigidity can help make it easier for the cover to be placed over and/or removed from a bicycle.

The resilient element suitably comprises a resilient wire or rod, such as a stiffened rod. The wire or rod can be formed from any suitable material, such as a metal or a polymer.

The cover also has a folded configuration in which it takes up less space, and is suitable for being stored. Suitably the cover can be folded into a generally flat, circular shape. For example, the folded configuration of the cover can be between approximately 20 cm and 50 cm in diameter. Suitably the folded configuration is approximately 30 cm in diameter. The folded configuration can be between approximately 4 cm and 10 cm in thickness. Suitably the folded configuration is approximately 6 cm in thickness. In the folded configuration, the cover 10 is folded so as to coil up the resilient element (or both of the resilient elements). As a result, the resilient element need not comprise a fold or join, but can be provided as a continuous element.

The coiling of the resilient element means that there are no sharp bends in the resilient element. Folding of the cover 10 into the folded configuration can be achieved by twisting the resilient element (or twisting both resilient elements together) so as to coil up the resilient element.

Suitably the cover 10 can comprise one or more pairs of folding points. These folding points are located and/or indicated on the cover 10 such that by moving one of a pair of folding points towards the other of the pair of folding points, the cover 10 moves towards the folded configuration. Suitably three pairs of folding points can be provided. The folding points can be located on the cover 10 in the locations as indicated in FIGS. 1 and 2. Suitably the cover 10 can be folded by moving one of a first pair of folding points (FP1) to the other of the first pair of folding points, then moving one of a second pair of folding points (FP2) to the other of the second pair of folding points, and then moving one of a third pair of folding points (FP3) to the other of the third pair of folding points (in the illustrated example one of the third pair of folding points is located on the second material piece 12 near the fourth engagement portion 23 so as to be obscured by the third engagement portion 23 when the covering portion 20 is closed). Performing the folding actions in this way results in a coiling of the resilient element, and results in the cover 10 being moved into the folded configuration.

The resilience of the resilient element(s) means that the cover can be placed in its folded configuration easily, by a series of simple folds and/or twists of the cover. The use of the three pairs of folding points assists the user in being able to fold the cover in a particular, for example repeatable, way. This can optimise the folding for storage of the cover.

The resilience of the resilient elements suitably assists in the deployment of the cover, meaning that the cover can be deployed quickly and conveniently. For example, the cover can be deployed within about 10 seconds. The ability of the cover to move from the expanded configuration to the folded configuration via the series of simple folds and/or twists of the cover can help make folding the cover quick and convenient. For example, the cover can be folded for storage within about 10 seconds.

The coiling of the resilient element means that energy is stored in the coils of the resilient element when the cover 10 is in the folded configuration. The cover 10 will therefore have a tendency to move towards the expanded configuration, such as by opening up or springing open.

Figure 8A:
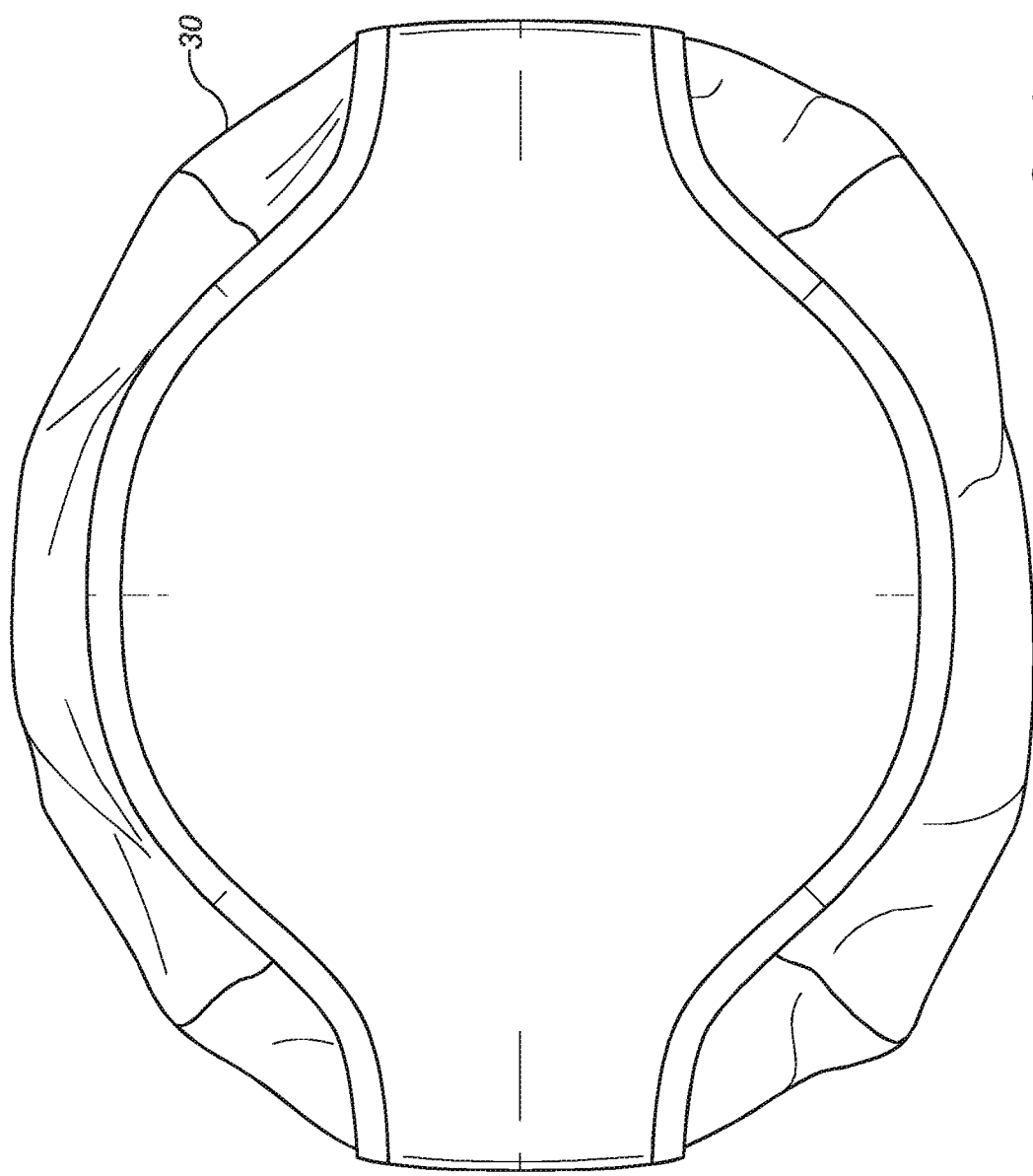
FIGS. 8a and 8b illustrate a storage bag for use with the bicycle cover of FIG. 1.
Figure 8B:
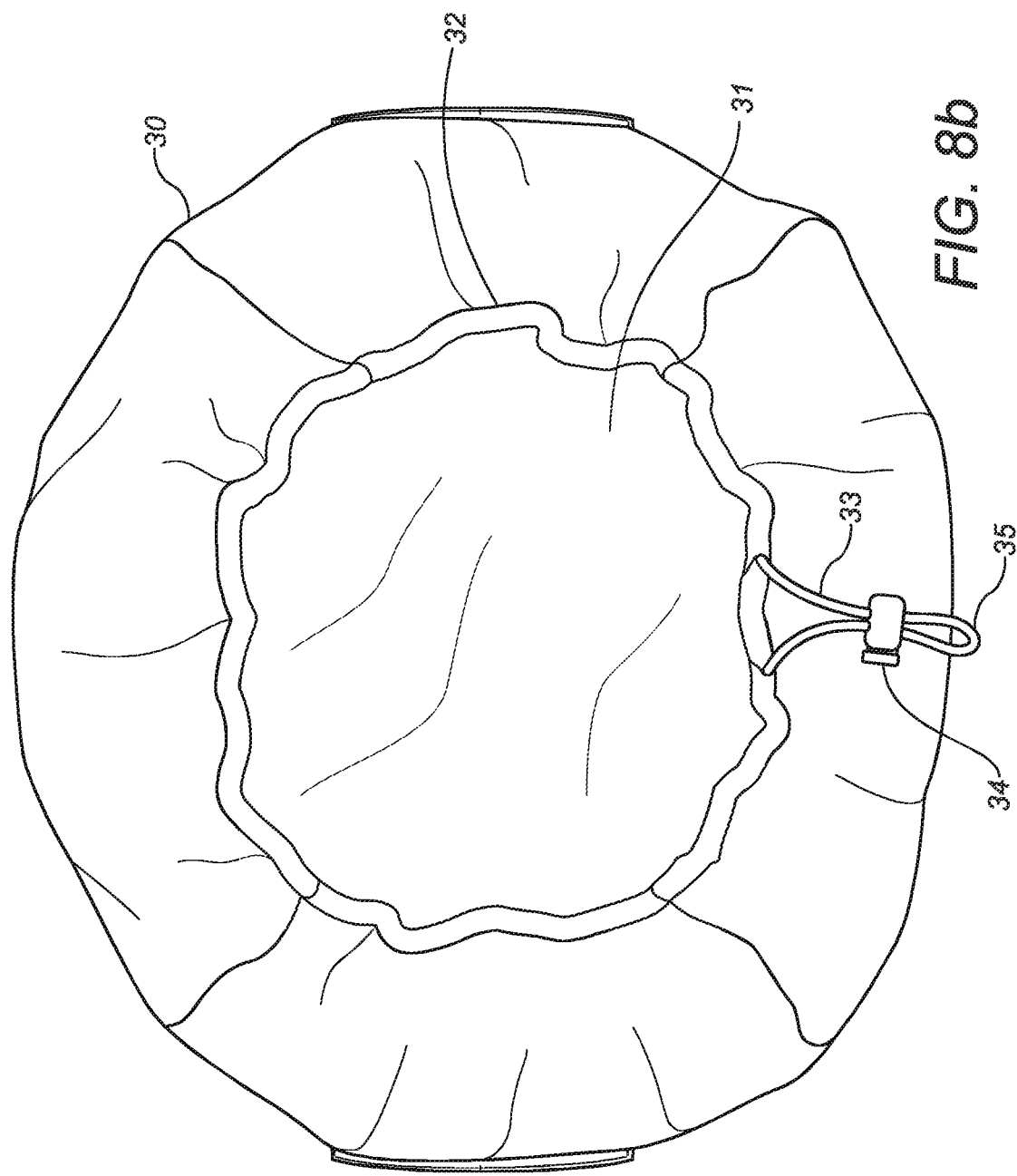

To prevent this from occurring when it is not desired, the cover 10 is retainable in the folded configuration by a strap and/or band around the folded cover, or by placing the folded cover in a storage bag. An example of a storage bag for storing the folded cover is illustrated in FIGS. 8*a* and 8*b* at 30.

The storage bag 30 can be made from a flexible and/or compliant material. The storage bag comprises an aperture 31 through which the cover 10 can be inserted into the storage bag 30. The aperture 31 is bounded by an aperture periphery 32. The aperture 31 can be at least partially closed by shortening the effective length of the aperture periphery 32. In the illustrated example this is achieved by providing a pull cord 33 which passes through the aperture periphery 32 and is gathered by a sprung clasp 34. Pulling on a free end 35 of the pull cord 33 will cause the material of the aperture periphery 32 to gather together, shortening the effective length of the aperture periphery 32 and thereby closing the aperture 31. The sprung clasp 34 permits the aperture 31 to be kept closed by retaining a captured portion of the pull cord 33. Any other suitable means for closing the aperture 31 could be used.

The storage bag 30 ensures that any dirt on the cover 10 itself is not transferred to the surroundings as the cover 10 is stored or transported in the folded configuration.

On removal of the cover 10 from the storage bag 30, the cover 10 is suitably able to expand towards the expanded configuration under action of the resilient element. In other words, it does not need to be unfolded by a user. This permits ease of use, and enables the cover 10 to be taken out of the storage bag 30 with one hand, expanded into its expanded configuration whilst the user may retain a hold of it with one hand, and then used to cover the bicycle. Since the user is able to do this with one hand, they can hold onto the bicycle with the other hand, preventing the need to lay the bicycle on the ground (which might damage it by causing scratches for example, or cause it to become dirtier still).

Figure 9:
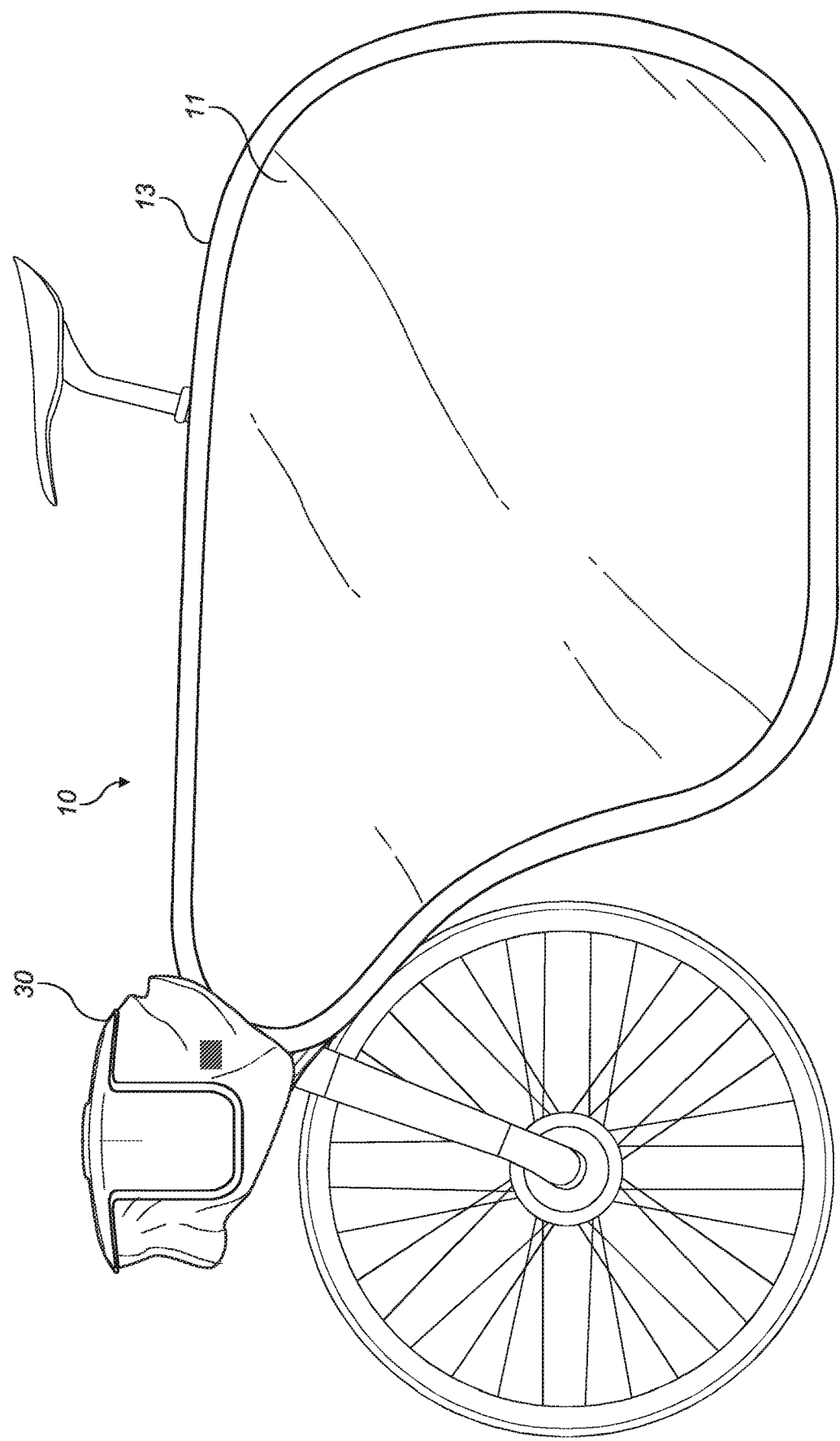
FIG. 9 illustrates the bicycle cover and the storage bag in place around a bicycle.

The storage bag 30 can also double as a handlebar cover, as illustrated in FIG. 9. The storage bag 30 can be used to cover the handlebars of a bicycle to restrict the transfer of any dirt from the handlebars to the surroundings and/or protect the handlebars from the surroundings. The storage bag 30 can also help protect the surroundings from being damaged by the handlebars and/or brake levers. The storage bag 30 therefore suitably comprises sufficient material to permit the storage bag to extend around the handlebars.

The storage bag 30 can cover the handlebars by inserting the handlebars through the aperture 31 of the storage bag. The aperture may then be closed so as to retain the storage bag on the handlebars.

As discussed above, the cover 10 and/or the storage bag 30 can restrict the transfer of dirt from the bicycle to the surroundings, thereby helping to keep the surroundings clean. The cover 10 and/or the storage bag 30 can also be used to protect the bicycle, for example from knocks and/or scratches.

The cover 10 and/or the storage bag 30 may be formed from a material which can assist in protecting the bicycle. The material may be a padded material, or there may be padding provided together with the material as part of the cover. Such padding may comprise a foam, such as an EVA (ethylene-vinyl acetate) foam. Such padding may be about 5 mm thick, for example.

Suitably the storage bag comprises at least one foam portion, and the storage bag is configured so that the foam portion lies adjacent the handlebars/brake levers when the storage bag is placed over the handlebars. This can assist in protecting the handlebars/brake levers from damage.

Suitably at least one of the first material piece and the second material piece comprises a second foam portion. Suitably the second foam portion is provided so as to be locatable adjacent a pedal, the chain and/or the pedal crank when the cover is mounted to a bicycle. In this way the second foam portion can provide additional protection to the respective part of the bicycle. Suitably the other of the first material piece and the second material piece comprises a third foam portion, provided in a corresponding manner to the second foam portion. Suitably at least one of the second foam portion and the third foam portion is a circular foam portion. This allows protection to be maintained irrespective of the rotational position of the pedal crank.

Suitably at least a portion of the material of the cover 10 and/or the storage bag 30 comprises a water resistant material such as a waterproof material. Suitably at least a portion of the material of the cover 10 and/or the storage bag 30 comprises a ripstop material, for example a plastic material such as ripstop polyester or nylon.

In another example, one of the first material piece 11 and the second material piece 12 is provided with a hole through which a securing strap can be passed. Such a hole can be used to receive therethrough a strap such as a seatbelt in a vehicle. The hole communicates with an interior of the cover 10. The strap can pass out through the gap or opening between the first material piece and the second material piece. In this way, the cover 10 can be used to cover a bicycle whilst permitting it to be securely fastened within a vehicle. FIG. 2 illustrates one example of such a hole 40 in the cover 10. The hole is suitably covered by a portion of material adjacent the interior of the cover 10. A passage is provided between the covering portion of material and the material of the side of the cover, through which the strap can pass. The covering portion of material assists in restricting transfer of dirt from the bicycle to the surroundings.

The applicant hereby discloses in isolation each individual feature described herein and any combination of two or more such features, to the extent that such features or combinations are capable of being carried out based on the present specification as a whole in the light of the common general knowledge of a person skilled in the art, irrespective of whether such features or combinations of features solve any problems disclosed herein, and without limitation to the scope of the claims. The applicant indicates that aspects of the present invention may consist of any such individual feature or combination of features. In view of the foregoing description it will be evident to a person skilled in the art that various modifications may be made within the scope of the invention.

The invention claimed is:

1. A bicycle cover comprising:
   a first material piece,
   a second material piece,
   a first resilient element, and
   a joining portion for joining the first material piece and the second material piece; the first resilient element being provided about a periphery of the first material piece, the bicycle cover having a folded configuration in which portions of the first material piece and the second material piece lie adjacent one another and an expanded configuration in which the cover is adapted to receive a bicycle between the first and second material pieces, the first resilient element being biased to urge the cover towards the expanded configuration;
   in which, in the expanded configuration:
      the cover defines a gap between the first material piece and the second material piece around at least a portion of the periphery of the first and second material pieces,
   the bicycle cover further comprising a closure portion for at least partially closing the gap, the closure portion being attachable to the first material piece and releasably engageable to the second material piece, the closure portion comprising:
      a first engagement portion being releasably engageable with a second engagement portion of the second material piece to at least partially close the gap;
      a third engagement portion releasably engageable with a fourth engagement portion of the second material piece to at least partially close the gap;
   the first and third engagement portions being spaced from one another, and the closure portion comprising a material portion between the first and third engagement portions;
      in which when the closure portion is engaged with the second material piece a rear wheel of the bicycle is permitted to protrude through the gap between the first material piece and the second material piece so that the rear wheel is movable along a surface, and
      when in use in the expanded configuration, a front wheel and handlebars of said bicycle are permitted to extend beyond the expanded cover to permit steering of said bicycle, and wherein the front wheel of said bicycle is movable along a surface.

2. A bicycle cover as claimed in claim 1, in which the first material piece and the second material piece are spaced from one another in the expanded configuration.

3. A bicycle cover as claimed in claim 1, in which the cover comprises a second resilient element provided about a periphery of the second material piece, the second resilient element being biased to urge the cover towards the expanded configuration.

4. A bicycle cover as claimed in claim 1, in which at least one of the first resilient element and the second resilient element are provided about the whole periphery of the respective material piece.

5. A bicycle cover as claimed in claim 1, in which at least one of the first resilient element and the second resilient element comprises a resilient wire or rod.

6. A bicycle cover as claimed in claim 1, in which the first engagement portion and the second engagement portion, and/or the third engagement portion and the fourth engagement portion, comprise cooperating engagement features, the cooperating engagement features comprising at least one of hook and loop fasteners, magnetic fasteners, press studs, and clip fasteners.

7. A bicycle cover as claimed in claim 1, in which the gap provides an opening for permitting a bicycle to be receivable within the cover, and the closure portion is releasably engageable with the second material piece for retaining the bicycle within the cover.

8. A bicycle cover as claimed in claim 1, in which the closure portion is adapted to close the gap adjacent a pedal of a bicycle within the cover.

9. A bicycle cover as claimed in claim 1, in which the joining portion comprises an opening, the opening being for receiving therethrough a saddle of the bicycle.

10. A bicycle cover as claimed in claim 1, in which the cover comprises a first fastening portion attachable to the first material piece and a second fastening portion attachable to the second material piece, the first fastening portion being releasably engageable with the second fastening portion to engage with a portion of a bicycle for retaining the bicycle within the cover.

11. A bicycle cover as claimed in claim 1, in which at least one of the first material piece, the second material piece, the joining portion and a material portion comprises a water-resistant material.

12. A bicycle cover as claimed in claim 1, in which the cover is arranged to protect the bicycle from its surroundings, and/or to protect the surroundings from the bicycle.

13. A bicycle cover comprising:
   a first material piece,
   a second material piece,
   a first resilient element, and
   a joining portion for joining the first material piece and the second material piece; the first resilient element being provided about a periphery of the first material piece, the bicycle cover having a folded configuration in which portions of the first material piece and the second material piece lie adjacent one another and an expanded configuration in which the cover is adapted to receive a bicycle between the first and second material pieces, the first resilient element being biased to urge the cover towards the expanded configuration;

in which, in the expanded configuration, the cover defines a gap between the first material piece and the second material piece around at least a portion of the periphery of the first and second material pieces, the bicycle cover further comprising a closure portion for at least partially closing the gap, the closure portion being attachable to the first material piece and releasably engageable to the second material piece, wherein the closure portion passes from the first material piece to the second material piece and wherein the closure portion is arranged, in use, to pass underneath a bicycle to provide protection to parts of said bicycle adjacent to the closure portion, in which when the closure portion is engaged with the second material piece a rear wheel of the bicycle is permitted to protrude through the gap between the first material piece and the second material piece so that the rear wheel is movable along a surface, and when in use in the expanded configuration, a front wheel and handlebars of said bicycle are permitted to extend beyond the expanded cover to permit steering of said bicycle, and wherein the front wheel of said bicycle is movable along a surface.

* * * * *